United States Patent
Kitamura et al.

Patent Number: 5,276,810
Date of Patent: Jan. 4, 1994

[54] INFORMATION ITEM SELECTION APPARATUS PRODUCING MULTI-CHANNEL OUTPUT SIGNALS

[75] Inventors: Masatsuga Kitamura, Yokohama; Kyosuke Tokoro, Tokyo; Satoru Toguchi, Yokohama, all of Japan

[73] Assignee: Victor Company of Japan, Ltd., Yokohama, Japan

[21] Appl. No.: 721,783

[22] Filed: Jun. 26, 1991

[30] Foreign Application Priority Data

Jun. 27, 1990 [JP] Japan .................. 2-68046[U]
Nov. 30, 1990 [JP] Japan ................ 2-130588[U]

[51] Int. Cl.⁵ .................................. G06F 13/14
[52] U.S. Cl. .......................... 395/250; 395/425
[58] Field of Search ............ 395/250, 275, 425; 364/236.3, 236.4, 239, 239.6, 239.7, 246.6, 243.1, 243.2, 243.3, 243.4, 246, 246.1, 246.2

[56] References Cited

FOREIGN PATENT DOCUMENTS 3-145828 6/1991 Japan .

OTHER PUBLICATIONS

Text Search and Retrieval Examiner Training Manual for the Automated Patent System (APS), pp. 1-5, PRC, Jan. 1990.

Primary Examiner—Robert L. Richardson
Assistant Examiner—Moustafa M. Meky
Attorney, Agent, or Firm—Lowe, Price, LeBlanc & Becker

[57] ABSTRACT

A multi-channel information item selection apparatus for outputting selected items when requested, has a plurality of frequently-requested information items, such as items of music, moving or still pictures, etc., stored in a first storage apparatus having a relatively high read-out speed, and a plurality of less frequently requested items stored in a second storage apparatus having a relatively low read-out speed, e.g. an appropriate speed for subsequent audio or video reproduction processing of the items. Items that are read out from the first storage apparatus are temporarily loaded into regions of a buffer memory at high speed and thereafter read out at the lower speed via a switch circuit to the respective requesting locations, so that a plurality of frequently-requested items can be simultaneously read out in parallel from the buffer memory. Items read out from the second storage apparatus are transferred directly through the switch circuit to the requesting locations. Efficiency of overall operation with low amounts of delay in responding to requests can thereby be achieved, by using a relatively low-capacity high-speed storage apparatus in combination with a relatively high-capacity low-speed storage apparatus.

6 Claims, 4 Drawing Sheets

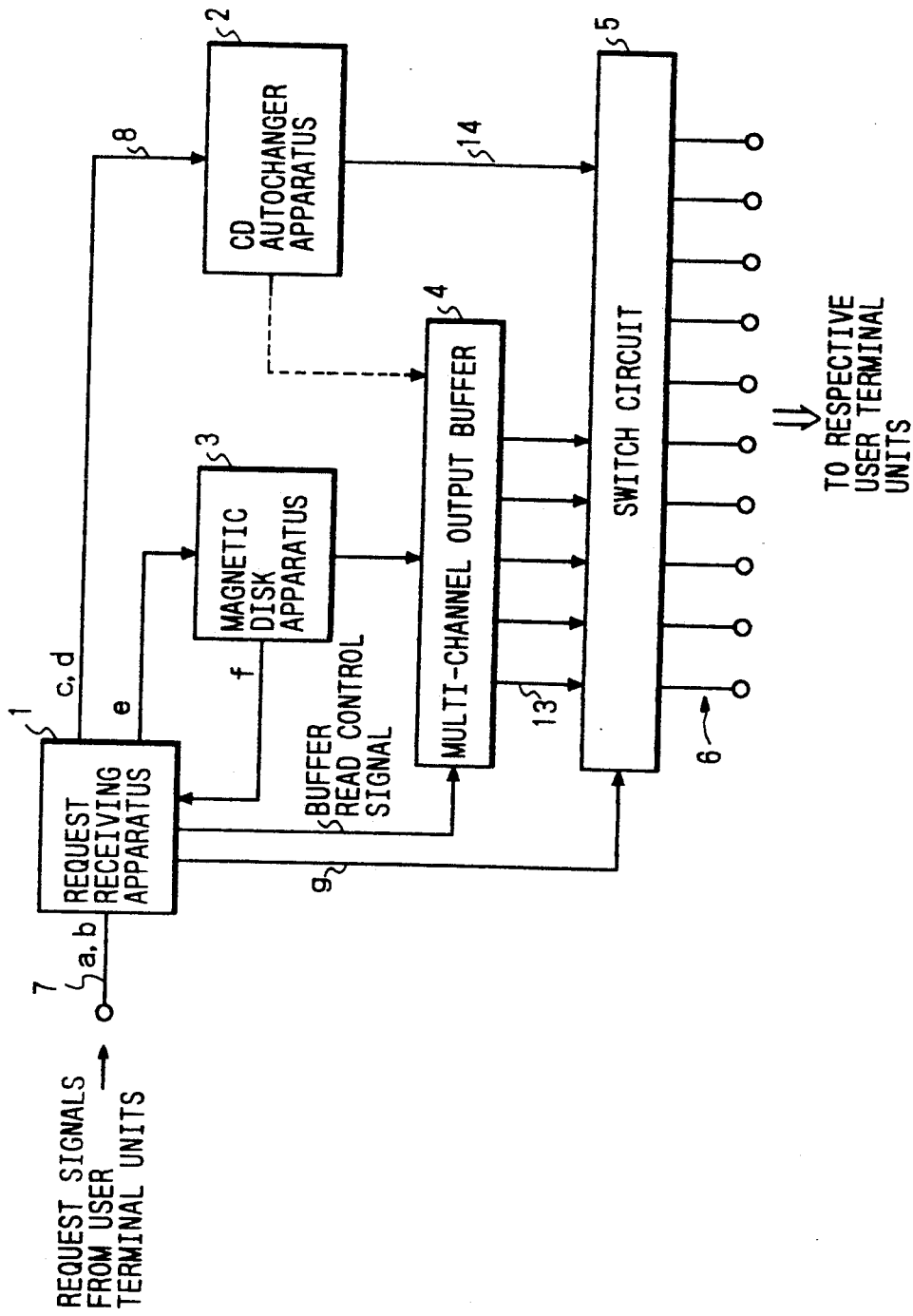

INFORMATION ITEM SELECTION APPARATUS PRODUCING MULTI-CHANNEL OUTPUT SIGNALS

BACKGROUND OF THE INVENTION

1. Field of the Invention

The present invention relates to an information item selection apparatus whereby selected items of information are supplied to various users in response to respective requests issued by the users.

The term "information" is used herein in a general sense, to include for example audibly reproduced music, speech, still or moving pictures, text, etc. The term "item of information" is used herein in a broad sense, to include the concept of a single item of a single type of information, such as an audibly reproduced music item (piece of music), and also to include the concept of a specific combination of two or more items of respectively different types of information, for example a predetermined combination of an audibly reproduced music item and an accompanying static or moving picture or text video display.

2. Description of the Prior Art

In the prior art, various types of information item selection apparatus have been envisaged for selecting, from among a large number of stored items of information, specific items that are to be supplied to users in response to requests that are issued by the users. With one type of prior art information item selection apparatus, information items are distributed to a number of information centers and stored therein, and are thereafter supplied from the centers to the users in response to respective requests. An important requirement for an information item selection apparatus in general is that the system should be capable of supplying information items to the users from the centers at high speed, using simple processing (in order to ensure that the system can be implemented at low cost), even under a condition in which a plurality of users are simultaneously inputting requests. However with such a prior art single-layer system, there will be a mixture of information items for which there is a high average frequency of requests from the users, and information items for which there is only a low frequency of requests. Thus it is difficult to execute processing efficiently, to thereby achieve the desired low cost of hardware for implementing the system.. Moreover it is necessary to store large amounts of information at each of the information centers.

One system that has been proposed in the prior art to overcome the above problems, whereby information items can be supplied in accordance with respective requests from a plurality of users, is proposed in Japanese patent Application No. 1-285177. That system has a multi-layer configuration, whereby information items which have the highest frequency of requests from the users are stored in a lowermost layer, the information items having the next-highest frequency of reqest are stored in a next-higher layer, and so on successively, with information items being stored in respective layers of the system in accordance with the frequency of requesting the items. When such a concept is applied to a large-scale information item selection apparatus which is configured with a large number of lower layers, with the number of information items stored in these layers being very large, then processing can be rapidly executed even when requests are received simultaneously from a large number of users. In such conditions, the system is effective. However when such a concept is applied to a system having only a small number of lower layers, where the total volume of information items and the general scale of the system is relatively small, then it becomes difficult to achieve a high speed of response when requests are received simultaneously from a number of different users. In such conditions, the processing efficiency is poor.

Moreover, such a system presents problems with respect to complexity of management. Specifically, when an item increases in popularity, and so has to be transferred to a lower layer of the system, that layer may already be full, in which case it will be necessary to delete from that layer some item which has fallen in popularity (i.e. has a lower frequency of requests). Thus, overall system control becomes complicated, due to the need to manage such transfers between layers and deletions of items.

A second problem which arises with a prior art information item selection apparatus is as follows. One area of application of such information item selection units is that of entertainment. An example of such an entertainment application is a so-called "karaoke" system using a multi-channel information item selection apparatus whereby a number of users can access a central unit, where the term "central unit" as used here signifies an apparatus in which are stored a large number of music items or combined music and video items, and which is responsive to request signals sent from users for transferring selected items to the users. Each of the users is provided with an individual terminal unit which is coupled to receive signals from the central unit. The term "user terminal unit" as used here signifies an apparatus which operates on signals sent from the central unit to provide the item to the user (i.e. to audibly reproduce music items and to display any video items) and which is provided with a switch which can be actuated by the user to issue request signals to the system central unit for desired items. Each terminal unit is also provided with a microphone which is connected to the music reproduction means, so that the user can sing while accompanied by the music (or music and and video items). The video items can include for example the words for a song which is the currently reproduced music item. The video and audio items are usually stored at the system central unit on special compact disks which have both music and video recorded thereon, the combination being sometimes referred to as "Compact Disk Graphics", or CDG, with specific disks being selected, and specific tracks on the disk then selected, by means of a compact disk autochanger apparatus which operates automatically. Thus with such a system, the CDG apparatus of the central unit is used in common by a plurality of users.

In the following, for brevity of description, the term compact disk, or CD will be used as a general term for a compact disk which has only music items recorded thereon and also for a CDG disk having both music and video items recorded thereon, and the term CD autochanger will be used in general for both an autochanger apparatus which is used to play conventional music-only CDs and for an autochanger which is used to play CDG disks.

To minimize the delay in responding to requests that are issued from a number of users simultaneously, with such a prior art "karaoke" system, a plurality of autochanger units can be used in parallel, so that while a compact disk (CD) is being played on one unit the system can be playing one or more other CDs, or loading a CD onto another autochanger unit.

Another type of entertainment application of a information item selection apparatus is that of providing television or other video/audio programs (e.g. shopping information, etc.) to various rooms of a hotel, as requested by the guests.

However with such a system, due to the fact that the facilities of the system central unit are being used in common by a plurality of users, there will frequently occur a condition in which a user issues a request for a particular information item which is currently unavailable, e.g. which is recorded on a CD that is currently being played in response to a previous request from another user. Moreover, even if a number of CD autochangers are operated in parallel at the system central unit there will frequently occur a condition in which no autochanger is currently available to service a request from a user. It is therefore desirable that such a system be provided with means for generating audible and/or visible messages at the user terminal units, to indicate that such a condition has occurred, i.e. to notify the user that there will be a short waiting interval before the request is serviced. It is also desirable to be able to display messages for various other reasons, for example in the case of a "karaoke" system that is installed in a bar or club, messages to notify the users of the closing time and opening time of the establishment. and so on.

One method of generating such messages is to use a voice synthesizer technique, by reading out data stored in a semiconductor memory and converting that to audio form. In the case of messages that are to be displayed visibly at the user terminal units, these can be stored in a video random access memory (RAM), e.g. as sets of mosaic characters, which are read out and supplied to the user terminal units when required. However each of these methods has the disadvantage of providing a much lower degree of audio or video reproduction quality than is normally provided at the user terminal units.

It is not practicable to record such messages on a CD to be played by an autochanger unit when required, since as described above there will be many occasions on which there will be no autochanger currently available.

SUMMARY OF THE INVENTION

It is an objective of the present invention to overcome the problems of the prior art described above. According to one aspect, this is done by providing a multi-channel information item selection apparatus having a simple system configuration whereby information items that are frequently requested are stored on a recording means which permits rapid access, such as a magnetic recording disk (e.g. hard disk) apparatus, and when requested are read out from that recording means into one of a plurality of channel regions of a multi-channel buffer memory to be outputted to a user therefrom in parallel with other information items, whereas information items that are infrequently requested are stored on a recording means having a high storage capacity and a relatively low read-out speed, such as a CD autochanger.

According to another aspect, the second problem of the prior art described above is overcome by recording one or more messages on a recording apparatus which has a relatively low speed of read-out, such as a CD autochanger. The system is provided with a buffer memory, and the message is loaded from the CD autochanger into a region of that buffer memory region, in the same form as an information item, at some time before the message will be required to be reproduced (e.g. when power to the system is switched on). The message can thereafter be repetitively read out from the buffer memory region whenever required. Alternatively, when the system is provided with a memory means having a high speed of data read-out, such as a magnetic disk recording apparatus, and a multi-channel buffer memory into which requested information items are loaded when requested, from that high read-out speed memory means, the message (or messages) is fixedly recorded on that recording means, and is loaded into a currently empty region of the buffer memory when it is required to be outputted. With either of the above methods, the same high level of reproduction quality is obtained for the message as for the audio or video information items that are normally outputted to the users.

More specifically, according to a first aspect, the present invention provides a multi-channel information item selection apparatus for supplying selected information items to respective ones of a plurality of output terminals, comprising:

output switch circuit means having a plurality of input terminals and a plurality of output terminals, operable for connecting each of the input terminals to a selected one of said output terminals;

first information item storage means having a first plurality of information items stored therein, and operable for successively outputting selected ones of the information items at a relatively high read-out speed;

multi-channel buffer memory means having a plurality of buffer channels respectively corresponding to specific ones of said input terminals of the output switch circuit means, said memory means being coupled to receive each of successive selected information items outputted at said relatively high read-out speed from said first information item storage means, for temporarily storing each information item in a corresponding one of said buffer channels and thereafter outputting said information item at said relatively low read-out speed to a corresponding one of said input terminals of said output switch circuit means;

second information item storage means having a second plurality of information items stored therein, operable for outputting selected ones of said information items to predetermined ones of said input terminals of said output switch circuit means in parallel with the first information item storage means and multi-channel buffer memory means;

request receiving circuit means for receiving successive input request signals each requesting that a specific one of said information items be supplied to a specific one of said output terminals of said output switch circuit means, for judging whether the specific information item is stored in said first or the second information item storage means, and if in said first information item storage means, for controlling the first information item storage means to output said specific information item to a vacant one of said buffer channels to be then read out from the one of said buffer channels and for controlling the output switch circuit means to connect said specific output terminal to one of the switch circuit input terminals that corresponds to said one of the buffer channels, and if said specific information item is judged to be stored in the second information item storage means, for controlling said second information item storage means to output the specific information item to one of said input terminals of the output switch circuit means and for controlling said output switch circuit means to connect said specific output terminal to said one of the output switch circuit input terminals.

According to a second aspect of said invention, the information item selection apparatus is further configured such that said first information item storage means has at least one message stored therein in the form of an information item, and wherein said message is read out from said first information item storage means into a vacant one of said buffer channels when required, under the control of said request receiving circuit means, to be supplied to a specific one of the output terminals of said output switch circuit means.

According to a third aspect of the invention, the information item selection apparatus is configured such that said second information item storage means has at least one message stored therein in the form of an information item, wherein at one of said buffer channels of said multi-channel buffer memory means is fixedly reserved for holding said message, and wherein said message is loaded into said one of said buffer channels at a point in time prior to being required, and is thereafter read out from said buffer channel when required, under the control of said request receiving circuit means, to be supplied to a specific one of said output terminals of said output switch circuit means.

As a result of the above basic configuration of an apparatus according to the present invention, whereby storage means having respectively different speeds of read-out are used to record information items having a relatively high frequency of requests by users and information items having a relatively low frequency of requests, respectively, it becomes possible to efficiently simultaneously transfer respectively different information items to the user terminal units from the system central unit in response to substantially simultaneous requests from a plurality of users.

In addition, such an information item selection apparatus can be configured to provide audibly or visibly reproduced messages to the users, with a high degree of reproduction quality, and with the messages being sent almost immediately after they become necessary.

BRIEF DESCRIPTION OF THE DRAWING

FIG. 4 is a general block diagram of a second embodiment of a multi-channel information item selection apparatus according to the present invention.

DESCRIPTION OF PREFERRED EMBODIMENTS

Figure 1:
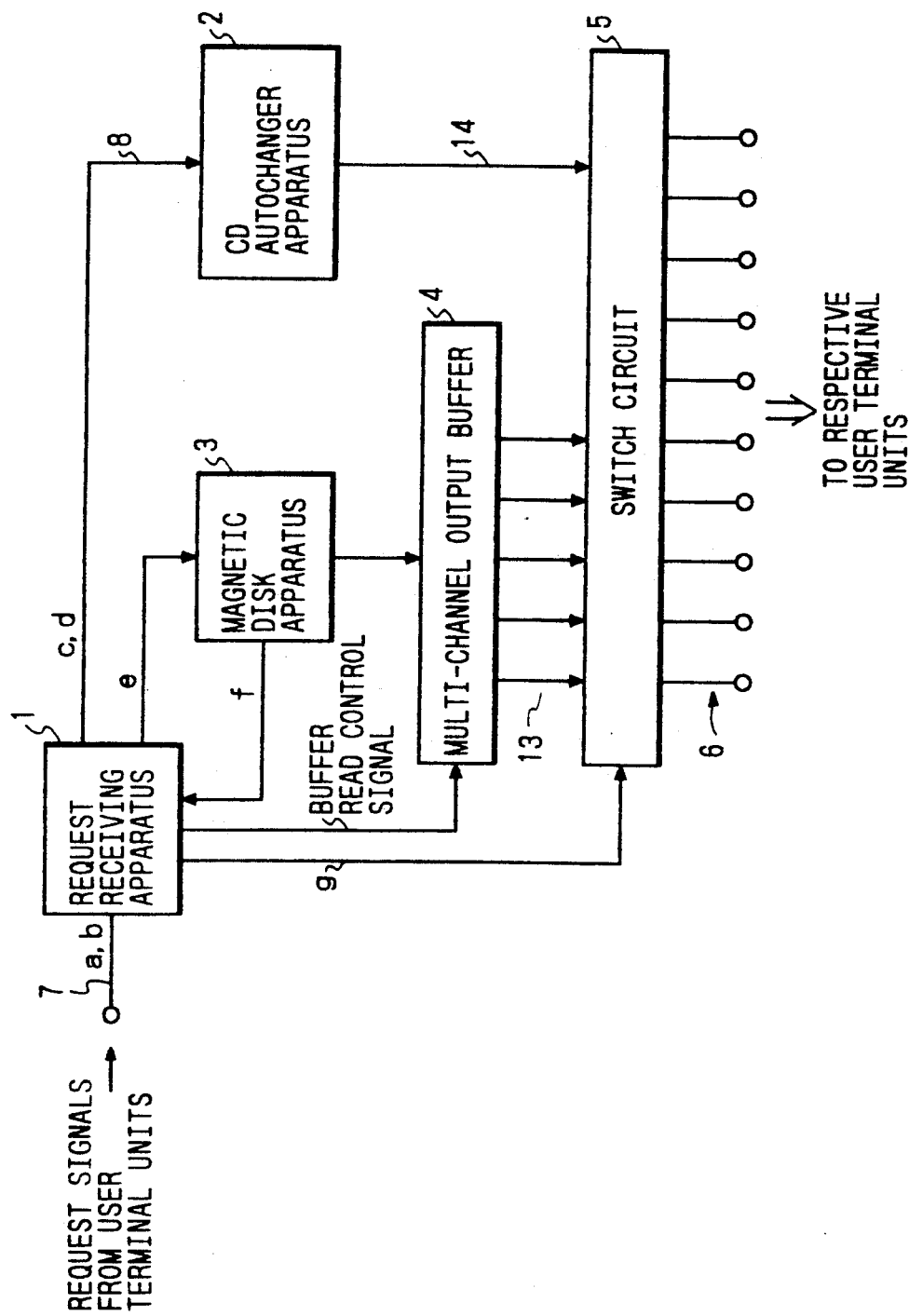
FIG. 1 is a general block diagram of a first embodiment of a multi-channel information item selection apparatus according to the present invention.

FIG. 1 is a general block diagram of a first embodiment of a multi-channel information item selection apparatus according to the present invention, in which numeral 1 denotes a request receiving apparatus which receives request signals 7 from a plurality of user terminal units (not shown in the drawing), requesting that information items be outputted to the user terminal units. The operation of the request receiving apparatus 1 is controlled by an internal microcomputer. Numeral 2 denotes a CD autochanger apparatus, which in this embodiment will be assumed to include a plurality of CD autochangers and circuits for controlling these to automatically play selected ones of a plurality of CDs in response to input signals supplied from the request receiving apparatus 1 as described hereinafter. The CD autochanger apparatus 2 thus is capable of storing a large number of information items, recorded on the CDs, but has a relatively slow speed of read-out of the information items. It will be assumed that all of these information items are music items. Numeral 3 denotes a magnetic disk apparatus, having a number of musical items recorded on a magnetic disk. The magnetic disk apparatus 3 has a much higher speed of read-out (for example, 10 times that of the CD autochanger apparatus 2), but a smaller storage capacity, by comparison with the CD autochanger apparatus 2. Numeral 4 denotes a multi-channel output buffer. This is a buffer memory having a number of separate buffer regions, referred to in the following as buffer channels, each capable of temporarily holding one musical item that is loaded therein from the magnetic disk apparatus 3. Each of these buffer channels is fixedly connected to supply the contents thereof to a corresponding one of a set of input terminals 13 of an output switch circuit 5. The output switch circuit 5 serves to selectively connect the input terminals 13 and an input terminal 14 to respective ones of a set of output terminals 6, each of which is fixedly connected to supply musical items to a corresponding one of the aforementioned user terminal units. For simplicity, only one output line from the CD autochanger apparatus 2, connected to one input terminal 14 of the output switch circuit 5 is shown. However of course if the CD autochanger apparatus 2 contains a plurality of CD autochangers, then each of these would be connected to output to respective input terminals of the output switch circuit 5. The output switch circuit 5 is controlled by switch control signals g supplied from the request receiving apparatus 1, which specify that a particular one of the input terminals 13 or 14 is to be connected to a specific one of the output terminals 6, in order to transfer a requested musical item to the requesting user.

The musical items which are stored in the magnetic disk apparatus 3 are items which have been found to have a relatively high frequency of requests from the users, whereas the musical items recorded on the CDs of the CD autochanger apparatus 2 are items which have a relatively low frequency of requests.

Figure 2:
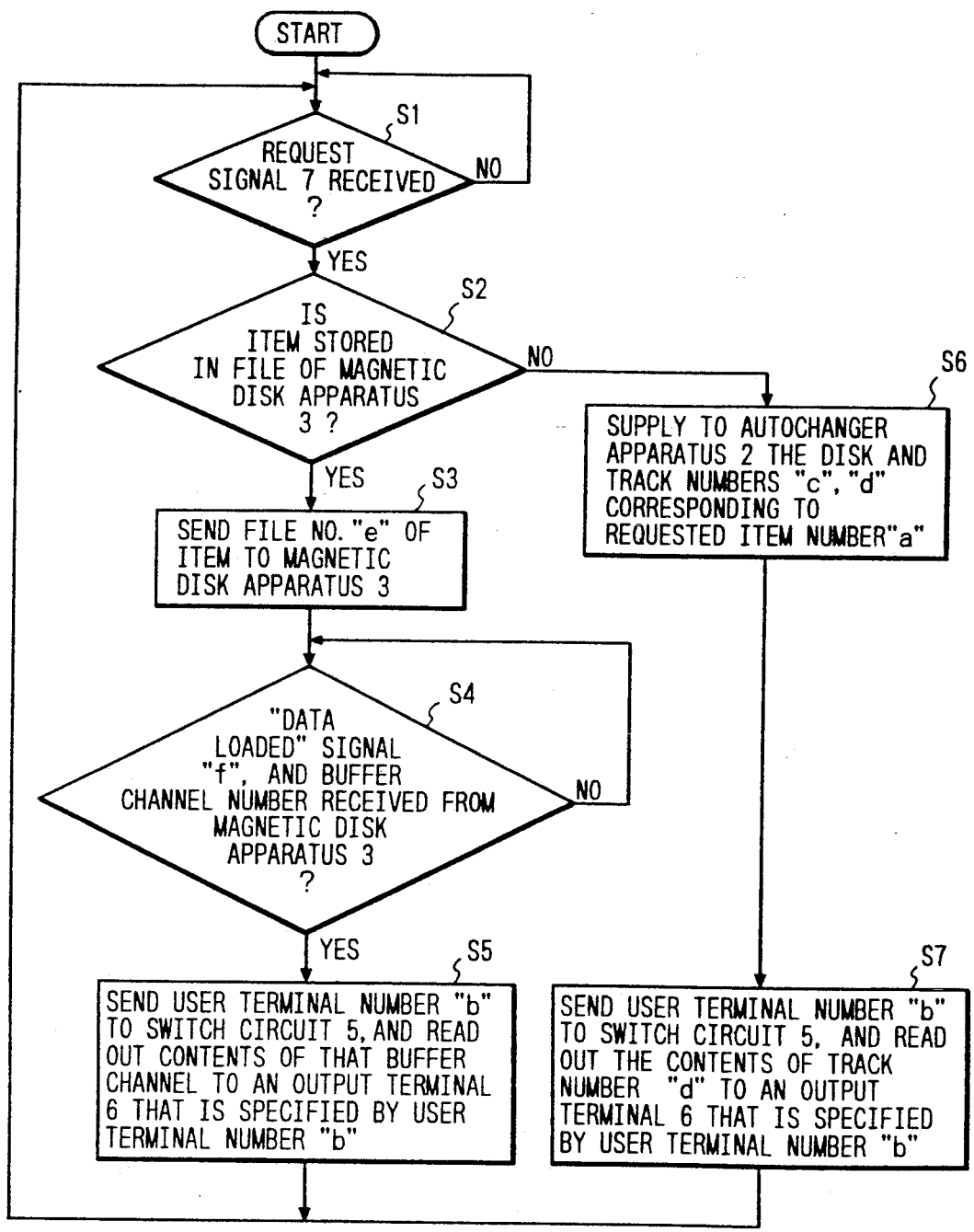
FIG. 2 is a flow diagram for describing the operation of the first embodiment.

The operation of the request receiving apparatus 1, determined by the internal microcomputer, is illustrated in the flow diagram of FIG. 2. It will be assumed in the following that the magnetic disk apparatus 3 is controlled by a separate microcomputer, which responds to input signals sent from the request receiving apparatus 1 and sends back response signals to the request receiving apparatus 1. However it would also be possible to control the entire system shown in FIG. 1 by a single microcomputer.

The overall operation of the apparatus is as follows. Each musical item is assigned a specific identifier number, which will be designated in the following as the number "a", while each user terminal unit is similarly assigned a specific identifier number, which will be designated as "b". The request receiving apparatus 1 contains a table memory which relates those musical items that are stored in the magnetic disk apparatus 3, each specified by the corresponding identifier number "a", with a corresponding file of the magnetic disk apparatus 3 which contains that musical item. The file number will be designated in the following as "e". The request receiving apparatus 1 also contains a table memory which relates those musical items that are recorded on the CDs of the CD autochanger apparatus 2, each specified by the corresponding identifier number "a", which is a combination of a number identifying the CD on which the musical item is recorded (that number being designated in the following as "c"), and a number identifying the track (i.e. region of the CD) in which the musical item is recorded (that number being designated in the following as "d"). When a request signal 7 is received from a user terminal unit, that signal includes the numbers "a" and "b", identifying the requesting user and the requested musical item. The request receiving apparatus 1 responds by searching in the aforementioned table memories to first determine if the requested musical item is stored in the magnetic disk apparatus 3, as shown by step S2 in FIG. 2.

If the musical item is found to be stored in the magnetic disk apparatus 3, then the request receiving apparatus 1 outputs to the magnetic disk apparatus 3 the file number "e" of that musical item, and in response, the magnetic disk apparatus 3 reads out the musical item from that file. For simplicity, it will be assumed here that there will be an empty buffer channel in the multi-channel output buffer 4 at that point, i.e. a buffer channel from which no musical item is currently being outputted to the output switch circuit 5. The musical item is loaded into such an empty buffer channel, with the loading operation being executed within a very short time, due to the high speed of read-out from the magnetic disk apparatus 3. When loading of that musical item into the buffer channel has been completed, the magnetic disk apparatus 3 sends back to the request receiving apparatus 1 a signal "f" which specifies the one of the input terminals 13 of the output switch circuit 5 corresponding to that buffer channel, and which indicates that loading into the buffer channel has been completed, as illustrated in step S4 of FIG. 2.

The request receiving apparatus 1 responds by sending to the output switch circuit 5 a signal "g", which specifies the one of the output terminals 6 that is connected to the user terminal unit having the identifier number "b", and also specifies the aforementioned one of the input terminals 13 which is connected to the buffer channel concerned. The output switch circuit 5 responds by connecting the specified one of the input terminals 13 to the specified one of the output terminals 6, as illustrated by step S5 in FIG. 2. The request receiving apparatus 1 then sends to the multi-channel output buffer 4 a signal commanding that the contents of that buffer be read out (i.e. at the relatively low speed of read-out that is necessary for subsequent reproduction of the musical item at the user terminal unit) from the specified buffer channel. The requested musical item is thereby transferred to the requesting user terminal unit, to be reproduced, i.e. audibly outputted from a loudspeaker or earphones.

In the above description, it is assumed that there is a vacant buffer channel available at the instant when required for loading the requested musical item therein from the magnetic disk apparatus 3. In practice, although not shown in the flow diagram of FIG. 2, there will be occasions when all of the buffer channels will be in use, in which case it will be necessary for the magnetic disk apparatus 3 to wait until a buffer channel of the multi-channel output buffer 4 becomes available, before loading a musical item from a file. However by using a sufficiently large number of buffer channels, in relation to the maximum anticipated number of users, it can thus be understood that at any given time, a plurality of musical items may be in the process of being read out from respective buffer channels of the multi-channel output buffer 4 (at the relatively low read-out speed) to be supplied to respective users via the output switch circuit 5, while at the same time a musical item may be in the process of being loaded into a vacant buffer channel from the magnetic disk apparatus 3 (at the relatively high read-out speed).

If on the other hand it is found in the step S2 of FIG. 2 that the requested musical item is not stored in the magnetic disk apparatus 3, then this is taken to signify that the item is recorded on a CD of the CD autochanger apparatus 2. Operation then proceeds to step S6 in FIG. 2, in which the request receiving apparatus 1 obtains the CD number "c" and track number "d" corresponding to the number "a" of the requested musical item, and supplies these to the CD autochanger apparatus 2, as illustrated in FIG. 1. Assuming that there is an autochanger that is currently available, the CD autochanger apparatus 2 automatically selects the CD corresponding to the number "c" and loads that onto the autochanger, then selects the track corresponding to the number "d" of that CD, to be played. At the same time, the request receiving apparatus 1 is supplying to the output switch circuit 5 a signal "g", which in this case designates the input terminal 14 that receives the output signal from the aforementioned autochanger that has just been loaded, and the one of the output terminals 6 that corresponds to the number "b" indicating the user terminal unit. The output switch circuit 5 responds by connecting that input terminal 14 to the appropriate output terminal 6, so that the requested musical item is supplied to the requesting user.

If there is no autochanger currently available, at the point when it is found that the requested musical item is recorded on a CD of the CD autochanger apparatus 2, then it will be necessary to wait until an autochanger becomes vacant. As for the case of the number of buffer channels of the multi-channel output buffer 4, the average duration of such a waiting interval can be made sufficiently small by using a sufficiently large number of autochangers.

Figure 3:
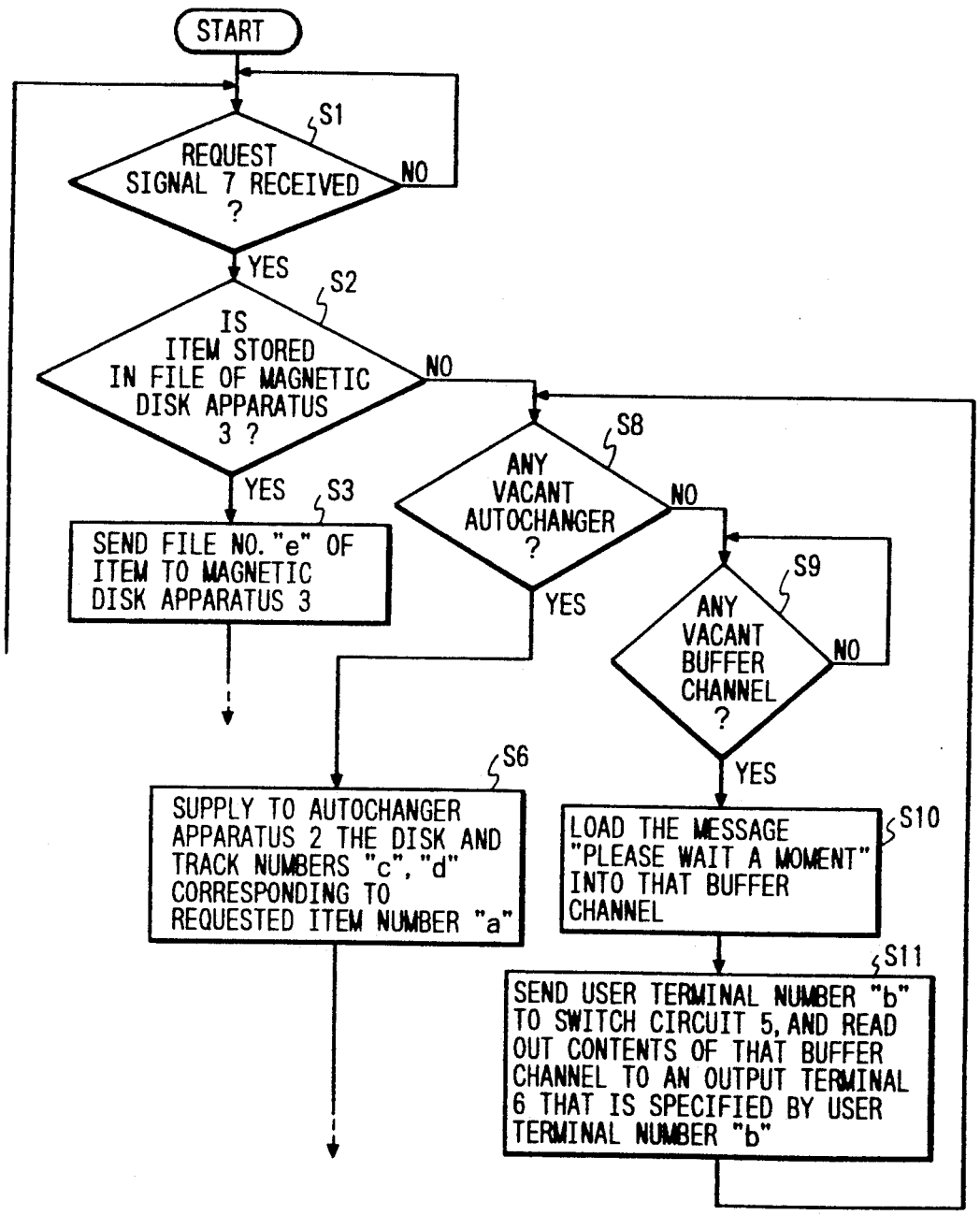
FIG. 3 is a flow diagram for describing the operation of a second embodiment of the present invention.

A second embodiment of a multi-channel information item selection apparatus according to the present invention will be described, whereby an arbitrary message, or a plurality of messages, can be outputted (visibly displayed and/or audibly reproduced) at selected user terminal units. It will be assumed for the purposes of description that, when it is necessary as described above to wait for a short time until an autochanger of the CD autochanger apparatus 2 becomes available to play a requested musical item, the message "Please wait a moment" is to be sent to the requesting user terminal unit. The system configuration of this embodiment can be identical to that shown in FIG. 1 and described hereinabove for the first embodiment. However with this embodiment, the message "Please wait a moment" is recorded in the magnetic disk apparatus 3 in the same way as the musical items, and the operation of this embodiment is modified as illustrated in the partial flow diagram of FIG. 3. In FIG. 3, steps S1 to S3 and. S6, and the steps (not shown) which succeed the steps S3 and S6, are identical to those shown in FIG. 2 and described hereinabove. However if it is found in the judgement step S2 by the request receiving apparatus 1 that a requested musical item is recorded on a CD of the CD autochanger apparatus 2, then a decision is made (step S8) as to whether there is an autochanger on the CD autochanger apparatus 2 that is currently available for playing the CD containing the requested musical item. If it is found that an autochanger is currently available, then operation proceeds to step S6 and the subsequent operation is identical to that of the first embodiment. However if it is found that there is no autochanger currently available, then a decision is made (step S9) as to whether there is a buffer channel currently vacant within the multi-channel output buffer 4. If there is no buffer channel currently vacant, then a (very short) waiting interval will occur until one becomes available, and when a buffer channel becomes vacant, the aforementioned message is immediately loaded into that buffer channel from the magnetic disk apparatus 3 (step S10 in FIG. 3). In addition, the request receiving apparatus 1 sends to the output switch circuit 5 a signal "g" which specifies the one of the output terminals 6 that is connected to the requesting user terminal unit (i.e. having the identifier number "b") and also specifies the one of the input terminals 13 which is connected to the buffer channel into which the message is loaded. The output switch circuit 5 responds by connecting the specified input terminal 13 to the specified output terminal 6, so that the message is sent to the user terminal unit of the requesting user. The user is thereby notified that there will be a short waiting interval before his request can be serviced. As soon as an autochanger becomes vacant thereafter in the CD autochanger apparatus 2, the operation proceeds to step S6 in FIG. 3, and the requested musical item is then sent to the requesting user as described hereinabove for the first embodiment.

A third embodiment of a multi-channel information item selection apparatus according to the present invention will be described referring to the general block diagram of FIG. 4. This is a modification of the second embodiment, whereby an arbitrary message (or plurality of messages) can be sent to selected users. However in this embodiment, instead of the message being stored in the magnetic disk apparatus 3, it is recorded on a CD of the CD autochanger apparatus 2. A dedicated buffer channel (or, in the case of a plurality of messages, a plurality of buffer channels) is reserved in the multi-channel output buffer 4 for holding the message. At some time prior to the message being required, for example when power to the information item selection apparatus is switched on to begin operation, the CD having the message recorded thereon is automatically played by the CD autochanger apparatus 2, and the message is sent (as indicated by the broken-line connection in FIG. 4) to be loaded into the aforementioned dedicated buffer channel. Thereafter, the message is held fixedly stored in that buffer channel, and can be read out any number of times to selected users, whenever necessary.

It will be understood that the operation of this third embodiment is substantially identical to that of the second embodiment described above. The only difference will be that the steps S9 and S10 in FIG. 3 become unnecessary, i.e. if there is a "no" decision in step S8, then the message is immediately read out of the aforementioned dedicated buffer channel of the multi-channel output buffer 4 and transferred to the requesting user terminal unit, in step S10.

Although for simplicity of description in the above, embodiments have been described for the case of only musical items being outputted from the output switch circuit 5, in general such a multi-channel information item selection apparatus can be used to supply information items each of which is a combination of music and video information, for example in the case of a "video karaoke" system. In that case the CD autochanger apparatus 2 will contain compact disks having audio and video material recorded thereon, and each information item will be expressed by a combination of audio and video signals when outputted from the multi-channel output buffer 4 or CD autochanger apparatus 2.

It can be understood from the above that the basis of the present invention lies in the fact that information items that have a relatively high frequency of request by the users are stored in the magnetic disk apparatus 3, while information items having a relatively low frequency of request are stored in the CD autochanger apparatus 2, and that the magnetic disk apparatus 3 (plus the multi-channel output buffer 4) and the CD autochanger apparatus 2 are mutually connected in parallel to supply output signals to users via the output switch circuit 5. Since the magnetic disk apparatus 3 has a much higher read-out speed than the CD autochanger apparatus 2 (e.g. typically 10 times as high), it becomes possible for the magnetic disk apparatus 3 to load one requested information item at high speed into a buffer channel of the multi-channel output buffer 4, then while that information item is being read out from that buffer channel (at the relatively low speed) the magnetic disk apparatus 3 can load another requested information item into another buffer channel, and so on. That is to say, it becomes possible for a plurality of information items to be outputted in parallel from the multi-channel output buffer 4. Hence a sufficiently high speed of access can be achieved for those information items which are frequently requested, so that there will be a minimum of delay in responding to requests, even if the same information item is requested almost simultaneously by a number of different users.

In the case of information items which are less frequently requested, and are stored in the CD autochanger apparatus 2, then as a result of the low frequency of requests there will be correspondingly high probability that at any particular time, an autochanger in the CD autochanger apparatus 2 will be available for use, and so can immediately play a requested information item.

Since in general there will be a small number of very popular information items, which are frequently requested, the magnetic disk apparatus 3 need only have a relatively small storage capacity. However requests for these popular information items can be rapidly serviced, as a result of the high read-out speed of the magnetic disk apparatus 3 and the consequent parallel outputting of information items from the multi-channel output buffer 4. In the case of less popular information items, these will in general be very large in number, but can be accommodated in the large storage capacity of the CD autochanger apparatus 2. Hence it can be understood that such a system can provide highly efficient operation, whereby delays in responding to requests for information items can be minimized, without the need for providing a storage apparatus having both a very high read-out speed and also a very large storage capacity. It will further be understood that the system configuration can be simple and that no complex control operations are required, so that such a system can be manufactured at low cost.

Although in the above description of the embodiments, for brevity of description, each of the input terminals 13, 14 and output terminals 6 of the output switch circuit 5 is referred to as if consisting of a single terminal, it will be apparent that in general each of these will consist of a set of terminals, as required to transfer the contents of an information item in a suitable signal form for reproduction by a user terminal unit. For example each might consist of a pair of terminals in the case of stereo musical items being outputted, three terminals in the case in which each information item consists of a stereo musical item accompanied by a video information item, and so on.

It will also be apparent that various modifications to the described embodiments could be envisaged, which fall within the scope claimed for the present invention.

What is claimed is:

1. A multi-channel information item selection apparatus for outputting selected information items, comprising:

output switch circuit means (5) having a plurality of input terminals (13, 14) and a plurality of output terminals (6), operable for connecting each of said input terminals to a selected one of said output terminals;

first information item storage means (3) having a first plurality of more frequently accessed information items stored therein, and operable for outputting selected ones of said information items at a first, relatively high, read-out speed;

multi-channel buffer memory means (4) having a plurality of buffer channels respectively corresponding to specific ones of said input terminals of said output switch circuit means, said memory means being coupled to receive each of successive selected information items outputted from said first information item storage means, for temporarily storing each information item in a corresponding one of said buffer channels and thereafter outputting said information item at a second, relatively low, read-out speed lower than said first read-out speed to a corresponding one of said input terminals of said output switch circuit means;

second information item storage means (2) having a second plurality of less frequently accessed information items stored therein, operable for outputting selected ones of said information items to predetermined ones of said input terminals of said output switch circuit means, at said second relatively low read-out speed, in parallel with said first information item storage means and multi-channel buffer memory means; and request receiving circuit means (1) for receiving successive input request signals (7) each requesting that a specific one of said information items be supplied to a specific one of said output terminals (6) of the output switch circuit means, for judging whether said specific information item is stored in said first or said second information item storage means, and if in said first information item storage means, for controlling said first information item storage means to output said specific information item to a vacant one of said buffer channels to be then read out from said one of the buffer channels and for controlling said output switch circuit means to connect said specific output terminal to one of said switch circuit input terminals that corresponds to said one of the buffer channels, and if said specific information item is judged to be stored in said second information item storage means, for controlling said second information item storage means to output said specific information item to one of said input terminals of the output switch circuit means and for controlling said output switch circuit means to connect said specific output terminal to said one of the output switch circuit input terminals.

2. A multi-channel information item selection apparatus according to claim 1, in which said first information item storage means comprises a magnetic disk apparatus having said first plurality of information items recorded thereon.

3. A multi-channel information item selection apparatus according to claim 1, in which said second information item storage means comprises a plurality of compact disks having said second plurality of information items recorded thereon, at least one compact disk autochanger apparatus, and means for controlling said autochanger apparatus to automatically select and play a specific one of said disks in response to control signals supplied from said request receiving circuit means.

4. A multi-channel information item selection apparatus according to claim 1, wherein said second information item storage means is directly connected to said output switch circuit means for outputting the selected information items therein directly to said predetermined input terminals of said output switch circuit at said second relatively low read out speed.

5. A multi-channel information item selection apparatus for outputting selected information items, comprising:

output switch circuit means (5) having a plurality of input terminals (13, 14) and a plurality of output terminals (6), operable for connecting each of said input terminals to a selected one of said output terminals;

first information item storage means (3) having a first plurality of information items stored therein, and operable for outputting selected ones of said information items at a relatively high read-out speed;

multi-channel buffer memory means (4) having a plurality of buffer channels respectively corresponding to specific ones of said input terminals of said output switch circuit means, said memory means being coupled to receive each of successive selected information items outputted from said first information item storage means, for temporarily storing each information item in a corresponding one of said buffer channels and thereafter outputting said information item at said relatively low read-out speed to a corresponding one of said input terminals of said output switch circuit means;

second information item storage means (2) having a second plurality of information items stored therein, operable for outputting selected ones of said information items to predetermined ones of said input terminals of said output switch circuit means, at a relatively low read-out speed, in parallel with said first information item storage means and multi-channel buffer memory means; and request receiving circuit means (1) for receiving successive input request signals (7) each requesting that a specific one of said information items be supplied to a specific one of said output terminals (6) of the output switch circuit means, for judging whether said specific information item is stored in said first or said second information item storage means, and if in said first information item storage means, for controlling said first information item storage means to output said specific information item to a vacant one of said buffer channels to be then read out from said one of the buffer channels and for controlling said output switch circuit means to connect said specific output terminal to one of said switch circuit input terminals that corresponds to said one of the buffer channels, and if said specific information item is judged to be stored in said second information item storage means, for controlling said second information item storage means to output said specific information item to one of said input terminals of the output switch circuit means and for controlling said output switch circuit means to connect said specific output terminal to said one of the output switch circuit input terminals;

wherein said second information item storage means (2) has at least one message stored therein in the form of an information item, wherein at one of said buffer channels of said multi-channel buffer memory means (4) is fixedly reserved for holding said message, and wherein said message is loaded into said one of the buffer channels at a point in time prior to being required, and is thereafter read out from said buffer channel when required, to be supplied to a specific one of said output terminals of the output switch circuit means.

6. A multi-channel information item selection apparatus for outputting selected information items, comprising:

output switch circuit means (5) having a plurality of input terminals (13, 14) and a plurality of output terminals (6), operable for connecting each of said input terminals to a selected on of said output terminals;

first information item storage means (3) having a first plurality of information items stored therein having a first frequency of access, and operable for outputting selected ones of said information items at a first, relatively high, read-out speed;

multi-channel buffer memory means (4) having a plurality of buffer channels respectively corresponding to specific ones of said input terminals of said output switch circuit means, said memory means being coupled to receive each of successive selected information items outputted from said first information item storage means, for temporarily storing each information item in a corresponding one of said buffer channels and thereafter outputting said information item at a second, relatively low, read-out speed lower than said first read-out speed to a corresponding one of said input terminals of said output switch circuit means;

second information item storage means (2) having a second plurality of information items stored therein having a second frequency of access lower than said first frequency of access, operable for outputting selected ones of said information items to predetermined ones of said input terminals of said output switch circuit means, at said second relatively low read-out speed, in parallel with said first information item storage means and multi-channel buffer memory means; and request receiving circuit means (1) for receiving successive input request signals (7) each requesting that a specific one of said information items be supplied to a specific one of said output terminals (6) of the output switch circuit means, for judging whether said specific information item is stored in said first or said second information item storage means, and if in said first information item storage means, for controlling said first information item storage means to output said specific information item to a vacant one of said buffer channels to be then read out from said one of the buffer channels and for controlling said output switch circuit means to connect said specific output terminal to one of said switch circuit input terminals that corresponds to said one of the buffer channels, and if said specific information item is judged to be stored in said second information item storage means, for controlling said second information item storage means to output said specific information item to one of said input terminals of the output switch circuit means and for controlling said output switch circuit means to connect said specific output terminal to said one of the output switch circuit input terminals;

wherein said first information item storage means (3) has at least one message stored therein in the form of an information item, and further including means for reading out said message from said first information item storage means into a vacant one of said buffer channels when required, to be supplied to a specific one of said output terminals of the output switch circuit means.

* * * * *

UNITED STATES PATENT AND TRADEMARK OFFICE
CERTIFICATE OF CORRECTION

PATENT NO. : 5,276,810
DATED : January 4, 1994
INVENTOR(S) : Masatsugu KITAMURA et al.

It is certified that error appears in the above-indentified patent and that said Letters Patent is hereby corrected as shown below:

On the title page, insert the following Item

--[75]   Masatsugu Kitamura, Yokohama; Kyosuke Tokoro, Tokyo; Satoru Toguchi, Yokohama, all of Japan--

Signed and Sealed this

Fourteenth Day of June, 1994

Attest:

BRUCE LEHMAN

Attesting Officer          Commissioner of Patents and Trademarks